United States Patent [19]
Ducret

[11] Patent Number: 5,809,652
[45] Date of Patent: Sep. 22, 1998

[54] CABLE STRIPPING DEVICE

[76] Inventor: Lucien C. Ducret, 9 Tod's Driftway, Old Greenwich, Conn. 06870

[21] Appl. No.: 745,909

[22] Filed: Nov. 7, 1996

[51] Int. Cl.⁶ ....................................................... H02G 1/12
[52] U.S. Cl. .............................................. 30/90.7; 30/90.9
[58] Field of Search ..................................... 30/90.1, 90.4, 30/90.7, 90.8, 90.9, 92, 93, 101, 102

[56] References Cited

U.S. PATENT DOCUMENTS

| | | | |
|---|---|---|---|
| 1,275,225 | 8/1918 | Cleve | 30/90.1 |
| 2,346,227 | 4/1944 | Martin et al. | 30/90.9 |
| 2,385,368 | 9/1945 | Montgomery | 30/90.7 |
| 3,089,237 | 5/1963 | Norton | 30/90.7 |
| 4,955,137 | 9/1990 | Matthews | 30/90.1 |
| 5,301,426 | 4/1994 | Regan | 30/90.9 |

FOREIGN PATENT DOCUMENTS

| | | | |
|---|---|---|---|
| 1294484 | 12/1962 | France | 30/90.7 |
| 24695 | 10/1902 | United Kingdom | 30/90.7 |

*Primary Examiner*—Hwei-Siu Payer
*Attorney, Agent, or Firm*—St. Onge Steward Johnston & Reens, LLC

[57] ABSTRACT

A cable stripping apparatus having a longitudinal axis for stripping, for example, jackets and/or armored steel shields from cables is disclosed. In the preferred embodiment, a cable receiving portion is mounted on a base. The cable receiving portion receives a cable and facilitates maintaining the cable in an orientation orthogonal to the longitudinal axis of the cable stripping apparatus. A carriage is operably connected to the base and is movable along the longitudinal axis of the apparatus. The carriage includes a rotatable cutting wheel housed at least partially inside the carriage. An adjusting shaft, operably connected to the carriage, moves the carriage in the longitudinal direction, i.e., toward and away from the cable receiving portion. A dial, operably connected to the cutting wheel, moves the cutting wheel along the longitudinal axis and thereby adjusts the distance that the cutting wheel extends from the carriage. A locking member locks the dial into a predetermined position so that the cutting wheel position is not disturbed during the stripping process. When a cable is properly positioned on the cable receiving portion, and when the cutting wheel is properly adjusted, the cable stripping apparatus allows a user to cut the jacket and/or armored steel shield of a cable with very high precision, i.e., to about a thousandth of an inch, thereby ensuring the sensitive cable housed inside is not damaged or destroyed during the stripping process.

20 Claims, 6 Drawing Sheets

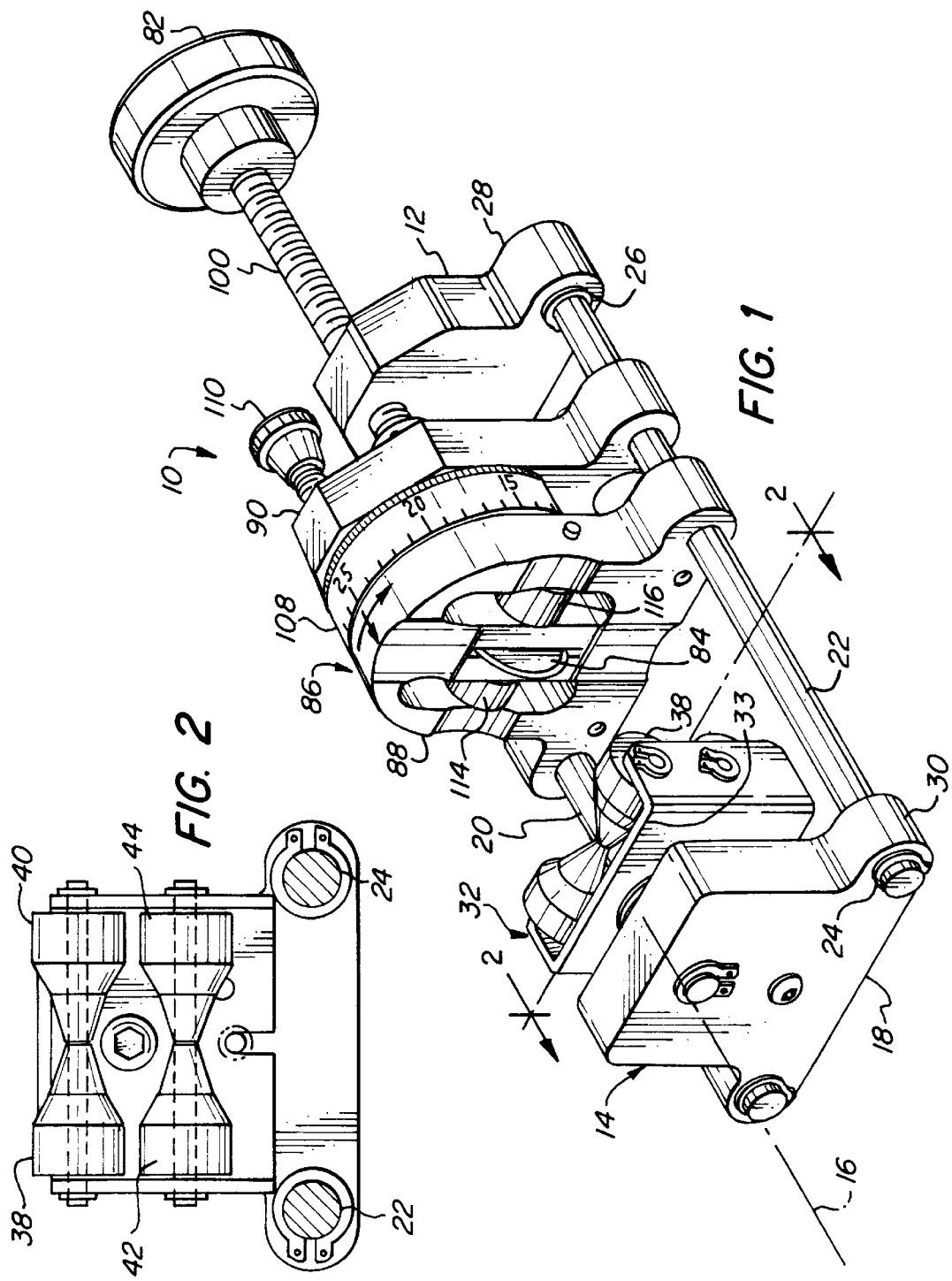

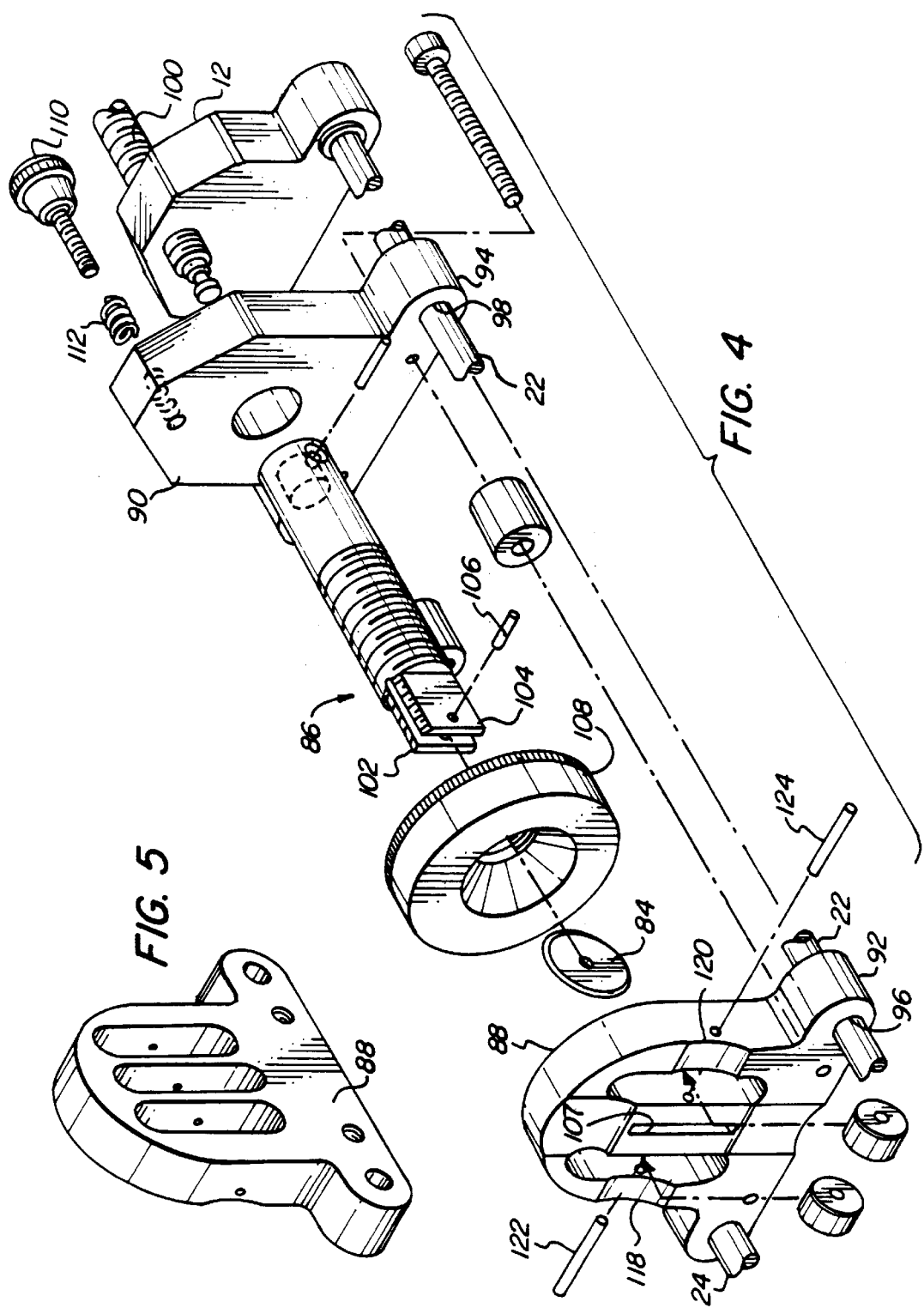

5,809,652

CABLE STRIPPING DEVICE

FIELD OF THE INVENTION

The present invention relates to a stripping device, and more particularly, to a cable stripping device useful for stripping jackets and other protective coverings off coaxial cables and the like with high precision.

BACKGROUND OF THE INVENTION

Coaxial cables, such as fiber optic cables, are difficult to strip using conventional means such as knives or tools with enclosed blades. This is because such cables have jackets which are typically made of very hard plastic which protect the fiber optic cable housed inside; these hard plastic jackets render the cables very rigid and difficult to work with. Some cable jackets are even stronger because they have an armored steel shield beneath the plastic jacket to provide additional protection for the fiber optic cable. These armored steel shields make the cables even more difficult to be suitably stripped with conventional strippers.

Conventional stripping devices are typically unable to cut through the plastic jacket and/or the armored steel shield beneath it with the necessary precision desired. If the sensitive fiber optic core housed within the plastic jacket and/or the armored steel shield is cut or otherwise damaged during the stripping process, the entire cable could be ruined, causing great expense to replace or repair. Consequently, extreme care must be exercised during the stripping process.

Additionally, conventional stripping devices which are capable of stripping a cable with any amount of precision are undesirable because they are limited to a cutting action in only one direction. For example, the device may only strip the cable either circumferentially or longitudinally. As a consequence, one must employ two cutting devices to obtain cuts in both directions. Additionally, conventional cutting devices are unable to cut the cable helically, i.e., spirally.

Accordingly, what is desired, therefore, is a stripping device which suitably strips the rigid hard-plastic jackets and/or armored steel shields beneath the hard-plastic jacket of cables with high precision, which desirably cuts the cable with high precision in both the circumferential and longitudinal direction, as well as helically, and which is relatively simple to manufacture and use.

SUMMARY OF THE INVENTION

Accordingly, it is an object of the present invention to provide a stripping device which strips the hard-plastic jacket and/or the armored steel shield beneath the hard-plastic jacket of cables with high precision.

It is another object of the present invention to provide a single stripping device which is capable of cutting the cable in three manners, i.e., circumferentially, longitudinally and helically.

It is still a further object of the present invention to provide a stripping device which has an exposed cutting blade which allows a user to visually ensure that a proper cut is being obtained.

It is yet a further object of the present invention to provide a stripping device which utilizes a series of rollers to facilitate positioning of the cable during the stripping process.

It is still a further object of the present invention to provide a stripping device which is relatively simple to use.

It is yet a further object of the present invention to provide a stripping device which is relatively easy to manufacture.

To overcome the deficiencies of the prior art and to achieve the objects and advantages listed above, a cable stripping apparatus for stripping jackets and/or armored steel shields from cables and the like is disclosed. In the preferred embodiment, the stripping apparatus comprises: a base; a carriage operably connected to the base and movable along a longitudinal axis of the stripping apparatus; and a cable receiving portion mounted on the base for receiving a cable and, when the carriage is operably positioned adjacent a cable positioned on the cable receiving portion, it maintains the cable in a position orthogonal to the longitudinal axis of the stripping apparatus. At least one, and preferably two, substantially parallel columns connect the carriage to the base and act as tracks for the carriage during movement. An adjuster, such as an adjusting shaft, is operably connected to the carriage and moves the carriage along the columns in the longitudinal direction, i.e., toward and away from the cable receiving portion.

A rotatable cutting wheel is housed at least partially inside the carriage. A dial, operably connected to the cutting wheel, adjusts the distance that the cutting wheel extends from the carriage so as to adjust the cutting depth of the wheel. The dial, which is preferably graduated (such as in thousandths of an inch or in metric dimensions, if desired), allows the user to finely adjust the depth of the cutting to the precise thickness of the jacket and/or armored steel shield of the cable. A locking member, such as a rotatable thumb lock screw, locks the dial into a predetermined position so that the precise setting of the cutting wheel is not disturbed during the stripping process.

The cable receiving portion of the cable stripping apparatus comprises a roller positioning plate and further comprises at least one roller and preferably a plurality of rollers rotatably connected to the roller positioning plate for facilitating the positioning of the cable on the cable receiving portion. Most preferably, each of the rollers has a substantially conically shaped portion and has a tip and a base. The rollers are positioned such that the tip of one roller abuts the tip of the other roller, forming a groove in which a cable to be stripped can rest during the stripping process. The groove substantially follows the shape of the cable and facilitates the positioning of the cable during the stripping process. In addition, the cable receiving portion is preferably rotatable to facilitate positioning the cable in a variety of orientations, as explained in more detail hereinafter.

In operation, a user positions a cable on the rollers of cable receiving portion. The dial is then rotated so as to extend the cutting member from the carriage a predetermined distance so as to ensure the cutting of the jacket of the cable to a proper depth. When the cutting member is properly positioned, the dial is locked via rotation of a thumb screw. Afterwards, the carriage is moved toward the cable through rotation of the adjustment shaft. The jacket and/or armored steel shield of the cable may then be cut to a desired depth.

Advantageously, the cable may be positioned on the rollers of the cable receiving portion in a variety of ways, depending on the type of cut desired. For example, if a user desires to cut the cable jacket and/or armored steel shield longitudinally, the cable should be placed on the cable receiving portion so that it extends between the columns of the stripping apparatus. If, however, one desires to cut the cable jacket circumferentially, then the cable should be positioned on the cable receiving portion such that it is parallel to a plane through the columns.

Additionally, if one desires to cut the cable jacket helically, then the cable receiving portion must be rotated by simply moving a screw from one slot to another, as discussed in more detail hereinbelow.

Thus, it can be seen that the present invention provides a new and useful device for stripping jackets, armored steel shields and the like from cables. Moreover, the present invention allows the user to make longitudinal, circumferential and helical cuts with one device in a simple and precise manner.

The invention and its particular features and advantages will become more apparent from the following detailed description when considered with reference to the accompanying drawings.

BRIEF DESCRIPTION OF THE DRAWINGS

FIG. 1 is an isometric view of a stripping device, positioned on its side and constructed in accordance with the present invention, the stripping device comprising a base, cable receiving portion, carriage and upper end plate;

FIG. 2 is a cross-sectional view of the stripping device, taken along line 2—2 of FIG. 1;

FIG. 4 is an exploded view of the carriage and upper end plate of the stripping device shown in FIG. 1, with portions cutaway for clarity;

FIG. 5 is an isometric view of one side of a bottom plate of the carriage, shown in FIGS. 1 and 4;

DETAILED DESCRIPTION OF THE DRAWINGS

Figure 3:
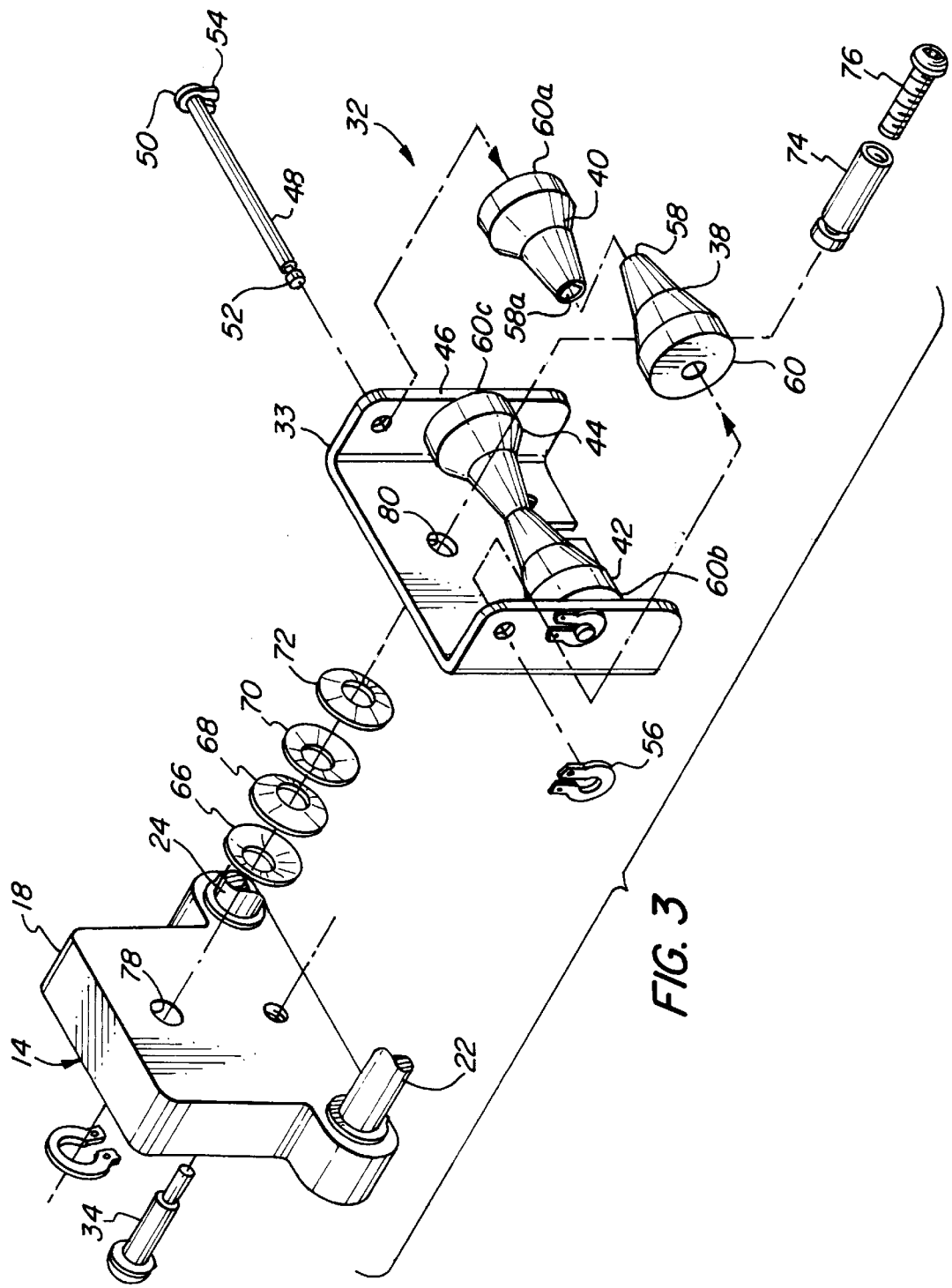
FIG. 3 is an exploded view of the base and cable receiving portion of the stripping device, shown in FIG. 1, with portions cut away for clarity.

Referring to the drawings in detail, a workpiece manipulating device, sometimes referred to as a cable stripping apparatus, is shown and generally designated by the reference numeral 10. It should be noted that for the sake of clarity all the components and parts of cable stripping apparatus 10 may not be shown and/or marked in all the drawings.

Cable stripping apparatus 10 may be in any of various orientations when in use. In FIG. 1, cable stripping apparatus 10 is illustrated positioned on its side for two reasons. First, cable stripping apparatus 10 may be used in a limited manner in this position, i.e., a cable 36 may be cut circumferentially when in this position. Second, this orientation best illustrates the different components of the stripping apparatus 10. It should be understood that, in order to perform all of the different types of cuts that cable stripping apparatus 10 is capable of, one must rotate cable stripping apparatus 10 from the position shown in FIG. 1, until it rests on base 14. Cable 36 could then be positioned in any of the positions shown in FIGS. 8–10, depending on the type of cut desired, as explained in more detail hereinbelow.

Referring to FIG. 1, cable stripping apparatus 10 comprises fixed upper end plate 12 and base 14. Base 14 comprises fixed, lower end plate 18, which is positioned opposite upper end plate 12. Upper and lower end plates 12, 18 are connected via any suitable manner known in the art, but preferably are connected via two substantially parallel columns 20, 22. Upper and lower fixed, end plates 12, 18 could be connected to columns 20, 22 in any suitable manner, such as by welding, clamps, or the like. Preferably, upper and lower end plates 12, 18 are fixed to columns 20, 22 by positioning them through suitably sized holes 24, 26 in protruding tabs 28, 30 of upper and lower end plates 12, 18, respectively, for example.

Cable receiving portion 32 comprises roller positioning member 33, which is fixedly connected to base end plate 18 via perpendicular screw 34 (FIG. 3).

As best shown in FIGS. 1–3, workpiece receiving portion 32 comprises at least one roller 38 rotatably connected thereto, which is shaped to facilitate the positioning of cable 36 to ensure proper cutting. It should be understood that any number of rollers and any desired size and shape roller 38 could be positioned on roller positioning member 33, so long as the positioning of cable 36 (FIG. 6, for example) is sufficiently facilitated. Most preferably, roller 38 is grooved or otherwise "VI" shaped, the shape of which substantially follows the shape of the cable to be cut. For example, a "V" shape substantially follows the shape of a round or oval cable. If other cable shapes are desired to be cut, it may be necessary to change the shape of the rollers, which would be obvious to one skilled in the art after reading this disclosure.

Preferably, to facilitate assembly of the device 10, cable receiving portion 32 comprises a plurality of rollers 38, 40, 42, 44 rotatably connected to roller positioning plate 33. See FIGS. 1, 2, 8–10, for example. Preferably, at least a first pair of rollers 38, 40 and, most preferably, a second pair of rollers 42, 44, each of which are substantially conically shaped, or frustro-conically shaped, are used.

As best shown in FIG. 3, each of the rollers 38, 40, 42, 44 are movably and rotatably connected to a sidewall 46 of the roller positioning member 33 via rotatable pin 48 inserted therethrough and terminate on each end with end pieces 50, 52 and cooperating washers 54, 56. Rollers 38, 40, 42, 44 may be connected, however, to roller positioning member 33 in any manner known in the art, so long as they are freely rotatable and desirably position cable 36 thereon.

Each of the rollers 38, 40 of each pair have a tip 58, 58a and a base 60, 60a, for example. The rollers of each pair are positioned such that the tip 58 of one roller 38 abuts the tip 58a of the other roller 40, for example. The rollers of the second pair 42, 44 are positioned such that the base 60b of one of the rollers 42 of the second pair is adjacent to the base 60 of one of the rollers 38 of the first pair and such that the base 60c of the other roller 44 of the second pair is adjacent to the base 60a of the other roller 40 of the first pair.

Figure 8:
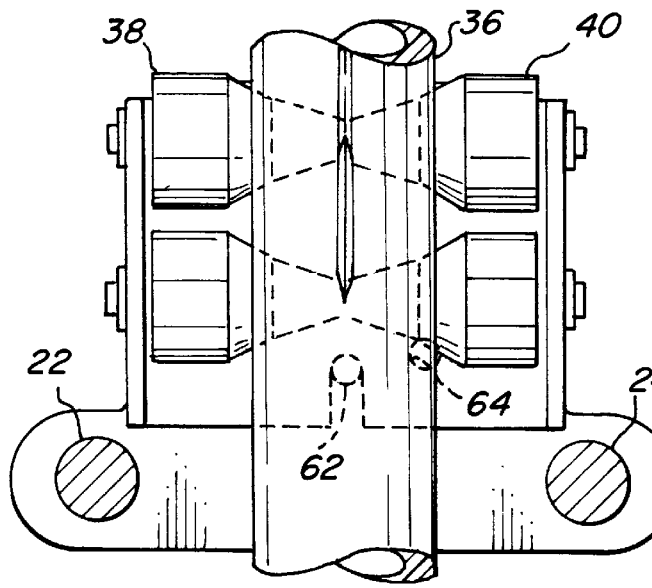
FIGS. 8–10 are cross-sectional views of the stripping device, taken along line 8—8 of FIG. 7, showing various cutting orientations of the stripping device.
Figure 9:
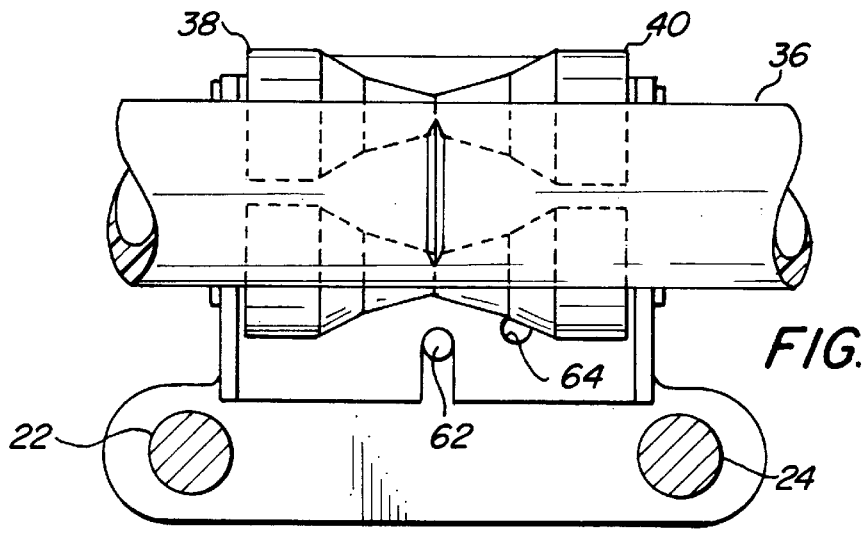
Figure 10:
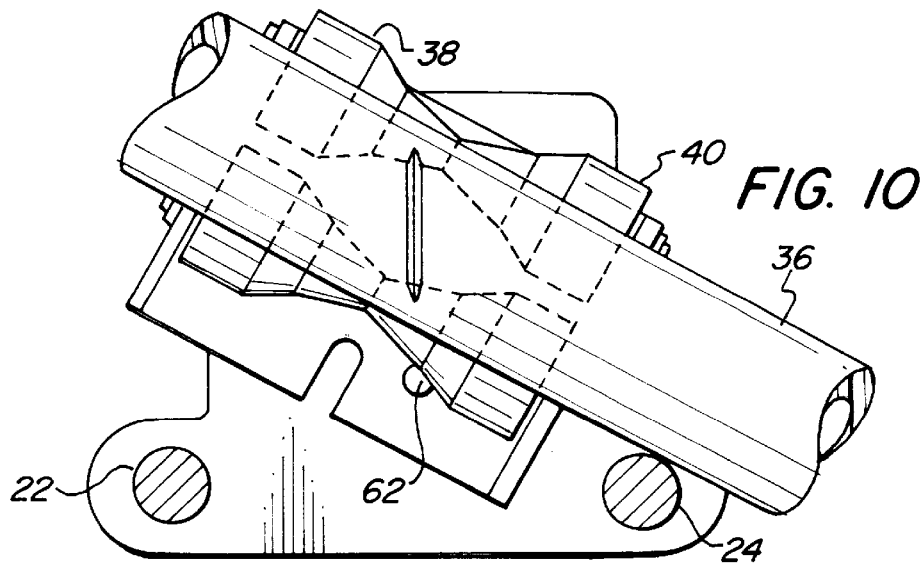

Advantageously, rollers 38, 40, 42, 44 allow cable 36 (FIG. 6, for example) to be positioned at right angles from the previous cutting position, as best shown in FIGS. 8 (for cutting cable 36 longitudinally) and FIG. 9 (for cutting cable 36 circumferentially). Moreover, as shown in FIG. 10, the cable receiving portion 32 may be rotated by moving screw 34 from slot 62 at the bottom of the fixed lower end plate 18 and inserting it into nearby slot 64. See FIGS. 8–10. Advantageously, this design feature allows cable 36 to be cut in a spiral manner, as shown in FIG. 10.

It should be understood that rollers 38, 40, 42, 44 can take on any size, shape and position desirable and need not be conical or maintained in the positions shown. For example, when the cable stripping is to take place near the end of cable 36, the conical rollers 38, 40, 42, 44 can be moved to face the sides of the roller support (not shown).

As best shown in FIG. 3, at least one washer 66, and preferably a plurality of washers 66, 68, 70, 72, is positioned about a substantially perpendicular shaft 74 between the base end plate 18 and roller positioning member 33. Shaft 74 receives threaded screw 76, both of which extend at least partially through an opening 78 in base end plate 18 and an opening 80 in roller positioning member 33.

Most preferably, washers 66, 68, 70, 72 comprise belleville washers. These conically-shaped belleville washers act as stiff springs which reduce and/or prevent overstressing of the cable stripping apparatus 10 while tightening the adjuster 100 with knurled knob 82 (FIG. 1), discussed herein below. Advantageously, this feature allows the rollers 38, 40, 42, 44 to follow the shape of cable 36 (FIG. 6, for example), such as when the cable is oval shaped. This is particularly important because an oval shape could cause the user to improperly increase the wheel penetration when cutting through the smallest portion of the oval shaped cable, resulting in deeper cuts in the larger oval section, which cuts could seriously damage the core.

As best shown in FIGS. 1, 4, 6–7, cable stripping apparatus 10 further comprises carriage 86, which is movably connected to base 14 through parallel columns 20, 22, between lower end plate 18 and fixed upper end plate 12. Carriage 86 comprises lower and upper base plates 88, 90, each of which have two protruding side tabs 92, 94, for example. Side tabs 92, 94 have apertures 96, 98, for example, sized and shaped for snugly receiving a parallel columns 20, 22, respectively, for example. Each column 20, 22 fits snugly enough to be stable for operation and use, however it must fit loosely enough to allow the carriage 86 to travel therealong.

Figure 6:
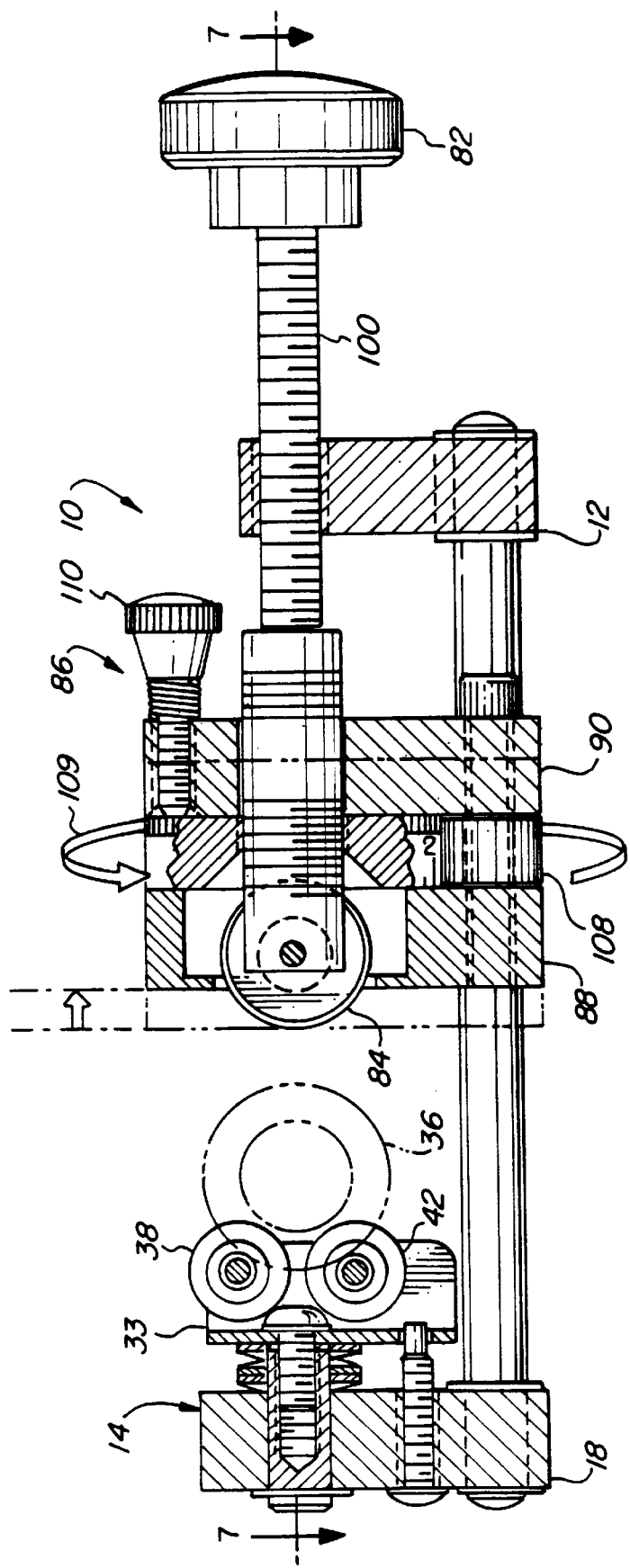
FIG. 6 is a cross-sectional view of the stripping device taken along line 6—6 of FIG. 7, with a cable shown in phantom, and indicating movement of the carriage along a longitudinal axis of the stripping device.
Figure 7:
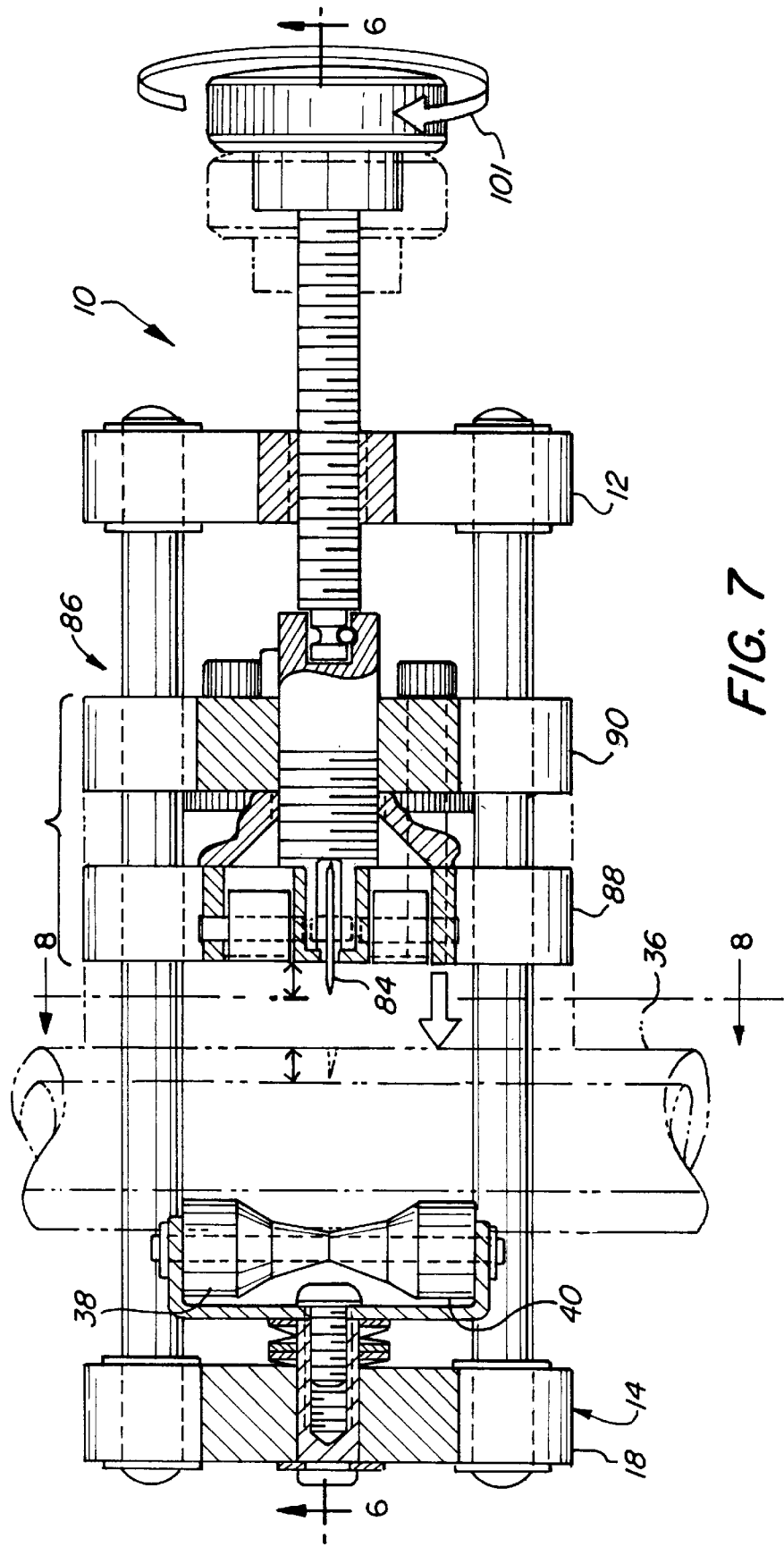
FIG. 7 is a cross-sectional view of the stripping device taken along line 7—7 of FIG. 6, with a cable shown in phantom, and indicating movement of the carriage along the longitudinal axis of the stripping device.

As shown in FIGS. 6–7, carriage 86 is movable along the longitudinal axis 16 of base 14 by rotation of threaded, rotatable adjustment shaft 100, sometimes referred to as an adjuster. As illustrated, threaded adjustment shaft 100 is positioned through the cable stripping upper end plate 12 and carriage upper base plate 90, each of which have complimentarily threaded portions (not shown). Threaded adjustment shaft 100 is rotated in either the clockwise or counterclockwise direction, as desired, through knurled knob 82, as indicated by arrow 101 in FIG. 7. It should be understood, however, that any suitable means known in the art can be used to adjust the carriage, including mechanical, electrical, hydraulic, and magnetic means.

As best shown in FIG. 4, rotatable cutting member 84 is maintained in position by two parallel positioning plates 102, 104 of adjuster 100. Pin 106 extends centrally through cutting member 84 and positioning plates 102, 104 and allow cutting member 84 to freely rotate therein.

As shown in FIGS. 1, 5–6, cutting member 84 is housed at least partially inside carriage 86 and movable along longitudinal axis 16 of stripping apparatus 10 through slot 107 in lower base plate 88 of carriage 86. Rotatable cutting member 84 has a circumferentially extending cutting edge, which is sharp enough to cut through any desired object such as cable jackets and armored steel shields, for example.

As best illustrated in FIGS. 1, 4, rotatable adjusting member or dial 108 is rotatable in the direction shown by arrow 109 and is positioned between carriage lower and upper base plates 88, 90 and adjusts the distance that the cutting edge of cutting member 84 extends from carriage 86 so as to fully gage the cutting member's penetration into cable 36 (FIG. 8, for example). As shown in FIG. 6, rotatable adjusting member 108 is a preferably a large dial graduated in any desired amount, such as thousandths of an inch. In the most preferred embodiment, each turn of the dial 108 moves the cutting member 84 about 0.040" or 1 mm. A series of serations about 0.040" apart on the shank of the cutting member support indicates the total penetration size such as 0.040", 0.080", 0.120", 0.160", etc., for convenience.

Referring in detail to FIG. 4, cable stripping apparatus 10 further comprises a locking member 110 for locking the dial into a predetermined position. In the preferred embodiment, the locking member 110 comprises a rotatable, threaded, thumb lock screw, which prevents the setting of the dial from being disturbed during use. Thumb lock screw 110 is partially encircled by spring 112 before extending into upper base plate 90 of carriage 86 having a complimentary threaded receiving portion (not shown). It should be understood, however, that any suitable locking device known in the art may be used.

Carriage base plate 88 further comprises at least one roller 114 for facilitating manipulation of workpiece 36 (FIG. 9, for example). Most preferably, carriage 86 comprises two rollers 114, 116 positioned on opposite sides of cutting member 84. Preferably, rollers 114, 116 are positioned in cutaway portions 118, 120 and maintained in position relative to lower base plate 88 via pins 122, 124. Each of these rollers 114, 116 serves to reduce friction as cable 36 (FIGS. 8–10, for example) is manipulated in the cable stripping apparatus 10. It should be understood that any number of rollers may be used so long as the manipulation of cable 36 (FIG. 6) is sufficiently facilitated.

A method for stripping fiber optic cables in accordance with the present invention comprises the following steps. First, cable 36 (FIG. 6) having a jacket is positioned in cable stripping apparatus 10 and, more particularly, onto rollers 38, 40, 42, 44 of cable receiving portion 32. See FIGS. 2, 8–10. Dial 108 is rotated so as to move cutting member 84 toward cable 36 and to a predetermined position so as to cut the jacket of the cable a proper depth, as shown by arrow 109 in FIG. 6.

When the cutting member 84 is properly positioned, dial 108 is locked via rotation of locking screw 110 so that the setting is not undesirably disturbed during use. Afterwards, carriage 86 is moved toward cable 36 through rotation of knurled knob 82 at the end of the adjusting shaft 100, as shown by arrow 101 in FIG. 7. The jacket and/or armored steel shield of cable 36 may then be cut to a desired depth.

Advantageously, cable 36 may be positioned on the rollers 38, 40, 42, 44 of cable receiving portion 32 in a variety of ways, depending on the type of cut desired. For example, if a user desires to cut cable 36 longitudinally, the cable 36 is be placed on the cable receiving portion 32 so that it extends between the parallel columns 20, 22, as shown in FIG. 8. In contrast, if one desires to cut cable 36 circumferentially, then it is positioned on cable receiving portion 32 such that it is parallel to a plane through the columns, as shown in FIG. 9. Additionally, one may cut the cable jacket helically, by rotating roller positioning member 33 from the positions shown in FIGS. 8–9 by moving screw 34 from one slot 62 at the bottom of fixed lower end plate 18 and inserting into nearby slot 64.

The present invention, therefore, provides a new and useful apparatus for cutting the jackets and/or armored steel shields of cables, such as fiber optic cables, with high precision. Further, one simple and easy to use device is provided for cutting cables in different manners, i.e., circumferentially, longitudinally and helically.

It should also be understood that the invention has been described for use with fiber optic cables for the sake of convenience only. Other articles may be cut in the same manner. This description is not intended to be limited to fiber optic cables.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A device for manipulating a workpiece, the device having a longitudinal axis, the device comprising:
    a base;
    a workpiece receiving portion rotatably secured to the base, said workpiece receiving portion capable of receiving and maintaining the workpiece in a variety of orientations relative to the longitudinal, axis of the device so that the device is capable of circumferentially, longitudinally, and helically cutting the workpiece; and
    a carriage operably connected to the base and movable along the longitudinal axis of the device, the carriage comprising:
        an adjustment shaft for moving the carriage along the longitudinal axis;
        a rotatable cutting member housed at least partially inside the carriage and movable along the longitudinal axis, the rotatable cutting member having a cutting edge; and
        a rotatable adjusting member for adjusting the distance the cutting edge extends from the carriage.

2. The device for manipulating a workpiece of claim 1, wherein the carriage further comprises a base plate having a slot, the cutting member movably positioned in the slot of the base plate of the carriage.

3. The device for manipulating a workpiece of claim 2, wherein the carriage base plate further comprises at least one roller for facilitating manipulation of the workpiece.

4. The device for manipulating a workpiece of claim 1, wherein the workpiece receiving portion comprises a roller positioning member and at least one roller rotatably connected thereto.

5. The device for manipulating a workpiece of claim 4, the roller shaped so as to facilitate the positioning of the workpiece on the workpiece receiving portion.

6. The device for manipulating a workpiece of claim 4, the base comprising a base end plate, positioned beneath the roller position member, and at least one washer positioned therebetween to reduce over-stressing of the device during rotation of the rotatable adjusting member.

7. The device for manipulating a workpiece of claim 6, wherein the washer comprises a belleville washer.

8. The device for manipulating a workpiece of claim 1, wherein the workpiece receiving portion comprises a roller positioning member and at least a first pair of rollers rotatably connected thereto.

9. The device for manipulating a workpiece of claim 8, each of the rollers being substantially conically shaped.

10. The device for manipulating a workpiece of claim 9, each of the rollers of the first pair having a tip and a base, the rollers of the first pair positioned such that the tip of one roller abuts the tip of the other roller.

11. The device for manipulating a workpiece of claim 10 comprising at least a second pair of substantially conically-shaped rollers, each of the rollers of the second pair having a tip and a base, the rollers positioned such that the base of one of the rollers of the second pair is adjacent to the base of one of the rollers of the first pair and such that the base of the other roller of the second pair is adjacent to the base of the other roller of the first pair.

12. The device for manipulating a workpiece of claim 1 further comprising a locking member for locking the rotatable adjusting member into a predetermined position.

13. A cable stripping apparatus for stripping cables, the cable stripping apparatus having a longitudinal axis, the cable stripping apparatus comprising:
    a base;
    a cable receiving portion rotatably secured to the base, said cable receiving portion capable of receiving and maintaining the cable in a variety of orientations relative to the longitudinal axis of the apparatus so that the apparatus is capable of circumferentially, longitudinally, and helically cutting the cable; and
    a carriage operably connected to the base and movable along the longitudinal axis of the cable stripping apparatus, the carriage comprising:
        a rotatable cutting wheel housed at least partially inside the carriage and movable in the longitudinal
        an adjuster, operably connected to the carriage, for moving the carriage in the longitudinal direction;
        a dial, operably connected to the cutting wheel, for adjusting the distance that the cutting wheel extends from the carriage; and
        a locking member for locking the dial into a predetermined position.

14. The cable stripping apparatus of claim 13, the carriage further comprising a base plate, the base plate having a slot, the cutting wheel movably positioned in the slot of the base plate of the carriage.

15. The cable stripping apparatus of claim 14, the cable receiving portion comprising a roller positioning member and at least one roller rotatably connected thereto for facilitating positioning of the cable on the cable receiving portion.

16. The cable stripping apparatus of claim 13, the cable receiving portion comprising a roller positioning member and at least a first pair of rollers rotatably connected thereto for facilitating the positioning of the cable on the cable receiving portion.

17. The cable stripping apparatus of claim 16, each of the rollers of the first pair being substantially conically shaped.

18. The cable stripping apparatus of claim 17, each of the rollers of the first pair having a tip and a base, the rollers of the first pair positioned such that the tip of one roller abuts the tip of the other roller.

19. The cable stripping apparatus of claim 18 comprising a second pair of substantially conically shaped rollers, each of the rollers of the second pair having a tip and a base, the rollers positioned such that the base of one of the rollers of the second pair is adjacent to the base of one of the rollers of the first pair and such that the base of the other roller of the second pair is adjacent to the base of the other roller of the first pair.

20. The cable stripping apparatus of claim 13, the base comprising a base end plate, the cable receiving portion comprising a roller positioning member, the roller positioning member positioned beneath the base end plate, and at least one washer positioned therebetween.

* * * * *

UNITED STATES PATENT AND TRADEMARK OFFICE
CERTIFICATE OF CORRECTION

PATENT NO. : 5,809,652
DATED : September 22, 1998
INVENTOR(S) : Lucien C. Ducret It is certified that error appears in the above-identified patent and that said Letters Patent is hereby corrected as shown below:

Column 4, line 25 "VI" should be replaced with --V--.

Column 8, line 26 "direction;" should be inserted immediately after --longitudinal--.

Signed and Sealed this

Twelfth Day of January, 1999

Attest:

Attesting Officer

*Acting Commissioner of Patents and Trademarks*